US012643101B2

(12) United States Patent
Shin

(10) Patent No.: US 12,643,101 B2
(45) Date of Patent: Jun. 2, 2026

(54) MICROFLUIDIC DEVICE FOR DETECTING NUCLEIC ACIDS

(71) Applicant: Korea University Research and Business Foundation, Seoul (KR)

(72) Inventor: Se-Hyun Shin, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 716 days.

(21) Appl. No.: 18/016,928

(22) PCT Filed: Jul. 23, 2021

(86) PCT No.: PCT/KR2021/009538
§ 371 (c)(1),
(2) Date: Jan. 19, 2023

(87) PCT Pub. No.: WO2022/019699
PCT Pub. Date: Jan. 27, 2022

(65) Prior Publication Data

US 2023/0285965 A1 Sep. 14, 2023

(30) Foreign Application Priority Data

Jul. 24, 2020 (KR) ........................ 10-2020-0092326

(51) Int. Cl.
*B01L 3/00* (2006.01)

(52) U.S. Cl.
CPC ..... *B01L 3/502753* (2013.01); *B01L 3/50273* (2013.01); *B01L 2300/18* (2013.01)

(58) Field of Classification Search
None
See application file for complete search history.

(56) References Cited

U.S. PATENT DOCUMENTS

2016/0109467 A1* 4/2016 Kolb .................. B01L 3/50273
435/7.25
2019/0113507 A1* 4/2019 Shin .................... C12Q 1/6816
(Continued)

FOREIGN PATENT DOCUMENTS

KR 10-2013-0135111 A 12/2013
KR 10-2016-0052400 A 5/2016
(Continued)

OTHER PUBLICATIONS

Shin, Chip for Testing Platelets and Platelet Testing Device Using Same, WO 2015/167047A1, English translation included. 2015 (Year: 2015).*
(Continued)

*Primary Examiner* — Lore R Jarrett
(74) *Attorney, Agent, or Firm* — NSIP Law

(57) ABSTRACT

The microfluidic device for detecting nucleic acids includes: a chip main body; a sample chamber formed inside the chip main body and into which a sample is injected; a waste chamber spaced apart from the sample chamber and formed inside the chip main body; a connection conduit formed inside the chip main body to connect the sample chamber and the waste chamber to thereby form a flow path of the sample in the sample chamber, and having an inlet connected to the sample chamber and an outlet connected to the waste chamber; a nucleic acid detection layer provided at the inlet of the connection conduit and having at least one micropore passing therethrough in the flow direction of the sample; and a probe linker formed on the surface of the nucleic acid detection layer.

7 Claims, 6 Drawing Sheets

(56) References Cited

U.S. PATENT DOCUMENTS

| | | | | |
|---|---|---|---|---|
| 2020/0269247 | A1* | 8/2020 | Shin | G01N 33/49 |
| 2021/0197191 | A1* | 7/2021 | Haun | C12M 45/09 |

FOREIGN PATENT DOCUMENTS

| | | | |
|---|---|---|---|
| KR | 10-2017-0064492 | A | 6/2017 |
| KR | 10-1799192 | B1 | 11/2017 |

OTHER PUBLICATIONS

Larsson et al. "In situ genotyping individual DNA molecules by target-primed rolling-circle amplification of padlock probes." *Nature methods* vol. 1 No. 3, Dec. 2004 (pp. 227-232).
Liu et al. "An isothermal amplification reactor with an integrated isolation membrane for point-of-care detection of infectious diseases" *Analyst* vol. 136 No. 10, 2011 (pp. 2069-2076).
Mauk et al. "Microfluidic devices for nucleic acid (NA) isolation, isothermal NA amplification, and real-time detection." *Mobile Health Technologies. Humana Press, New York, NY*, 2015. (pp. 15-40).
Lee et al. "DhITACT: DNA hydrogel formation by isothermal amplification of complementary target in fluidic channels." *Advanced Materials* vol. 27 No. 23, 2015 (pp. 3513-3517).

* cited by examiner

MICROFLUIDIC DEVICE FOR DETECTING NUCLEIC ACIDS

CROSS REFERENCE TO RELATED APPLICATIONS

This application is a U.S. National Stage Application of International Application No. PCT/KR2021/009538, filed on Jul. 23, 2021, which claims the benefit under 35 USC 119 (a) and 365(b) of Korean Patent Application No. 10-2020-0092326, filed on Jul. 24, 2020, in the Korean Intellectual Property Office, the entire disclosure of which is incorporated herein by reference for all purposes.

FIELD

The present disclosure relates to a microfluidic device for detecting nucleic acid, and more particularly, to a microfluidic device for detecting nucleic acids capable of detecting nucleic acids such as RNA.

DESCRIPTION OF RELATED ART

Efficient amplification of a target nucleic acid such as a virus is a very important factor not only for nucleic acid detection but also for DNA sequencing and cloning. Several methods have been proposed for amplification of the nucleic acid. Examples thereof include polymerase chain reaction (PCR), ligase chain reaction (LCR), self-sustained sequence replication (SSR), nucleic acid sequence based amplification (NASBA), and strand displacement amplification (SDA).

Many of these methods are somewhat less accurate in quantitative measurements, and require expensive equipment. Especially when one or more target nucleic acids are to be analyzed at the same time, accuracy in quantitative measurements is further lowered.

An isothermal nucleic acid amplification reaction is developed to compensate for these disadvantages. Among the isothermal reactions, a rolling circle amplification (RCA) method is receiving a lot of attention. That is, conventionally, several techniques such as PCR have been employed to amplify a circular DNA. However, these methods have disadvantages in that they take a long time, have low efficiency, and consume high cost and manpower.

The PCR method is composed of a denaturation process in which DNA is separated into single strands in a reaction solution including primer pairs, templates, polymerases, and dNTPs while raising the temperature to a high temperature: an annealing process of binding a primer complementary to each DNA single chain to a template while lowering the temperature; and a process of polymerizing a new strand under a polymerization reaction using a polymerase while raising the temperature again. Through this amplification, the DNA chain grows exponentially. However, since the PCR process goes through the above processes, the temperature change is inevitably accompanied, and therefore, a temperature controller and heating means must be provided in a PCR device. However, when using PCR for amplification of a target nucleic acid in a lab-on-a-chip (LOC), etc., a temperature controller and a heater for PCR reaction are separately required in addition to a device such as a detection device for LOC. Thus, there are disadvantages in that the equipment is complicated and a cost of the equipment is high.

As a method to improve these disadvantages, several isothermal amplification methods have been proposed. A LAMP (loop-mediated isothermal amplification) method is one of these isothermal amplification methods, and generates a product of a multi-loop having a branch using six amplification primers. This LAMP method has some limitations in use for early diagnosis or in use as a biosensor because it uses early reverse transcriptase (RT) to detect a target RNA.

As another isothermal amplification method, a RCA method has been proposed. The RCA method has the advantage of not requiring the temperature change required in the PCR amplification as described above and thus being able to amplify a target nucleic acid in an isothermal state. Therefore, in a process requiring the amplification, amplification is performed without requiring a separate temperature control device, and the complexity and cost of the device can be reduced.

In a LRCA (linear rolling circle amplification) method, a target DNA sequence and an open circular probe are hybridized with each other to form a complex, which in turn is ligated to form an amplification target circle, and then a primer sequence and a DNA polymerase are put therein. An amplification target circle then forms a template on which new DNA is formed, and the template extends from the primer and extend into a continuous repeated sequence complementary to the amplification target circle, thereby producing thousands of copies of the nucleic acid for an hour.

An exponential RCA (ERCA) method is an improved method of the LRCA (linear rolling circle amplification). ERCA uses an additional primer sequence that binds to a cloned sequence complementary to the amplification target circle to provide a new amplification center, thereby providing exponentially increasing amplification. In the ERCA method, the strand displacement is continuous. However, the ERCA method is limited to using an initial single-stranded RCA product as a template for another DNA synthesis using an individual single-stranded linear primer attached to the product without additional RCA.

Another method is a method using a molecular padlock probe (MPP) and rolling circle amplification (RCA) (C. Larsson et al., Nat. Methods 2004, 1, 227). This method has several advantages. That is, this method has high specificity and performs amplification of a complementary nucleic acid in circular MPP via the process of distinguishing the target nucleic acid sequence. In particular, due to the direct coupling of the RCA product, improved sensing sensitivity is provided without a separate purification process. This method immobilizes target nucleic acid probes on a surface of a material such as gold or quartz via a simple chemical surface treatment, such that the RCA reaction may be initiated on the surface.

A following paper by Ho Yeon Lee et al. as published in 2015: 'DhITACT: DNA Hydrogel Formation by Isothermal Amplification of Complementary Target in Fluidic Channels (Jun. 17, 2015, Advanced Materials, Volume 27, Issue 23, Pages 3513-3517) discloses a scheme of preparing an RCA reaction surface on the bottom face of the microchannel and waiting for about two hours for the reaction thereof with the sample solution to generate a long single-stranded DNA. This scheme uses the self-assembling in the shape of multiple dumbbells such that the DNA is formed like a hydrogel, and thus, flow into the corresponding channel is prevented.

However, in the technique as disclosed in Ho Yeon Lee's thesis, the RCA response surface is formed on the bottom face of the microchannel, and the scheme should wait for the reaction period until the entire microchannel is blocked due to the amplification from the RAC reaction surface. Thus, the test time is 2 hours or larger.

Accordingly, the applicant of the present application has proposed a 'microfluidic device for detecting a target gene' as disclosed in Korean Patent No. 10-1799192. In the microfluidic device as disclosed in the Korean Patent, a microbead packing in which microbeads are packed, and a probe linker complementary to a target gene of the microbead is formed so that the target gene is bound to the probe linker. The target gene is detected using a phenomenon in which the pores between the microbeads are blocked due to the amplification of the target gene bound to the probe linker.

The microfluidic device as disclosed in the Korean registered patent has the advantage of reducing the inspection time by up to 15 minutes compared to the existing RCA method. However, demand for faster inspection is increasing day by day. This is because a faster inspection speed is required in a situation where an infectious disease caused by a virus spreads to a pandemic state.

Further, in actual application of the microbeads as disclosed in the Korean Patent, they are produced based on hydrogel and thus cannot be stored in a dry state. There is a concern about performance degradation due to long-term storage.

DISCLOSURE

Technical Purpose

Accordingly, the present disclosure is devised to solve the above problems, and aims to provide a microfluidic device for detecting nucleic acids in which in detecting a target nucleic acid, a test time is reduced while a nucleic acid detection layer can be stored in a dry state.

Technical Solutions

One aspect of the present disclosure provides a microfluidic device for detecting nucleic acids, the microfluidic device comprising: a chip body: a sample chamber defined in the chip body so as to receive a sample therein: a waste chamber spaced apart from the sample chamber and defined in the chip body: a connection channel defined in the chip body so as to connect the sample chamber and the waste chamber to each other, the connection channel acts as a flow path of the sample in the sample chamber, and has an inlet connected to the sample chamber and an outlet connected to the waste chamber: a nucleic acid detection layer installed in the inlet of the connection channel, the nucleic acid detection layer has at least one or more micro-holes extending therethrough in a flow direction of the sample; and a probe linker formed on a surface of the nucleic acid detection layer, the probe linker is amplified via complementary binding to the target nucleic acid in the sample and detects the target nucleic acid.

In one implementation, the micro-hole of the nucleic acid detection layer is blocked due to amplification via the complementary binding between the probe linker and the target nucleic acid, or a size of the micro-hole is reduced due to the amplification through complementary binding between the probe linker and the target nucleic acid, such that at least one of a final reach distance of the sample to the connection channel, an arrival time of the sample to the final reach distance, or a flow rate of the sample is changed, the target nucleic acid is detected based on at least one of the final reach distance, the arrival time, or the flow rate.

In one implementation, the microfluidic device further comprises stirring means installed in the sample chamber so as to stir the sample injected into the sample chamber, while the stirring means stirs the sample in the sample chamber, the probe linker of the nucleic acid detection layer and the target nucleic acid in the sample are complementarily bind to each other.

In one implementation, the sample in the sample chamber is stirred by the stirring means for a predetermined stirring time duration, and then flows along the connection channel.

In one implementation, the microfluidic device further comprises a sample heater for heating the sample in the sample chamber to a preset temperature range.

In one implementation, the present temperature range is set to a value within a range of 30 to 37° C., and the stirring time duration is set to a value within a range of 5 to 30 minutes.

In one implementation, a flow force for flowing the sample in the sample chamber along the connection channel includes at least one: a negative pressure from the waste chamber; a gravity based on a tilt of the chip body: or a differential head between the sample chamber in which the sample has been accommodated and the waste chamber in an empty state.

In one implementation, oil immiscible with the sample is injected into the sample chamber after the sample has been injected thereto, the oil is disposed on a top face of the sample so as to block the sample from an outside and to increase the gravity or the differential head for the flow of the sample to the connection channel.

In one implementation, the probe linker includes: a coated portion coated on a surface of the nucleic acid detection layer: a primer binding to the coated portion; and a template binding to the primer in a complementary manner, the template includes: a first binding site binding to the target nucleic acid: a second binding site binding to the primer in a complementary manner; and a complementary third binding site in the template so as to form a dumbbell shape, the first binding sites are respectively formed at both opposing ends of the template so as to be separated from each other, the second binding site is formed between the separated first binding sites, a ligase enzyme to promote complementary binding to the target nucleic acid is present at the first binding site.

In one implementation, the microfluidic device further comprises a sample sensor for detecting the sample flowing along the connection channel, at least one of the final reach distance, the arrival time, or the flow rate is measured based on a detection result of the sample sensor.

In one implementation, the connection channel includes a plurality of connection channels defined in the chip body so as to individually connect the sample chamber and the waste chamber to each other, each of the nucleic acid detection layers is installed in the inlet of each of the connection channels: the probe linkers respectively formed on the surfaces of the nucleic acid detection layers are made of different materials that respectively bind to different target nucleic acids.

In one implementation, the probe linker is not attached to the nucleic acid detection layer installed in the inlet of one of the plurality of connection channels, wherein the one of the plurality of connection channels acts as a negative reference channel.

In one implementation, the probe linker formed on the nucleic acid detection layer installed in one of the plurality of connection channels is configured such that nucleic acid amplification occurs regardless of presence of the target nucleic acid, one of the plurality of connection channels acts as a positive reference channel.

In one implementation, the nucleic acid detection layer includes a membrane or a mesh in which the micro-hole is formed.

Technical Effect

According to the above configuration, according to the present disclosure, the nucleic acid detection layer is installed in the inlet of the connection channel, so that when the sample chamber flows from the sample chamber to the connection channel, the sample flows directly through the micro-hole of the nucleic acid detection layer, thereby removing the bubble generation phenomenon and thus increasing the reproducibility of detection.

Further, as the bubble generation phenomenon is eliminated, not only may the restriction of flow pressure control be removed, but also using the single nucleic acid detection layer 130 may allow the flow control at a lower pressure than that when the microbead packing is used.

In addition, the existing microbead packing is in a form of a hydrogel, and thus there is difficulty in dry storage thereof. However, the nucleic acid detection layer according to the present disclosure is made of nylon, etc., such that dry storage thereof is possible.

DETAILED DESCRIPTIONS

Hereinafter, embodiments according to the present disclosure will be described in detail with reference to the accompanying drawings.

Figure 1:
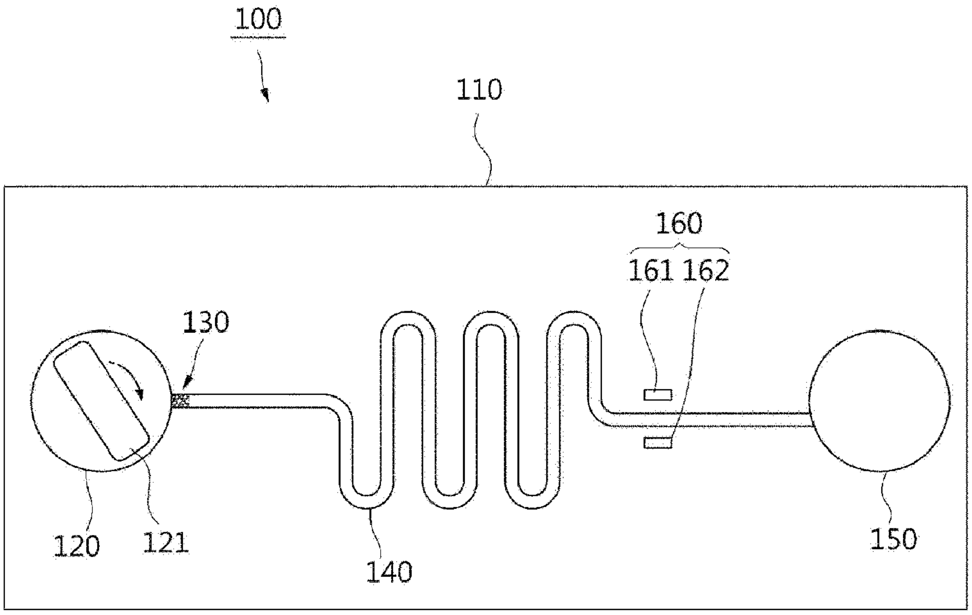
FIG. 1 is a diagram showing a microfluidic device for detecting nucleic acids according to an embodiment of the present disclosure.
Figure 2:
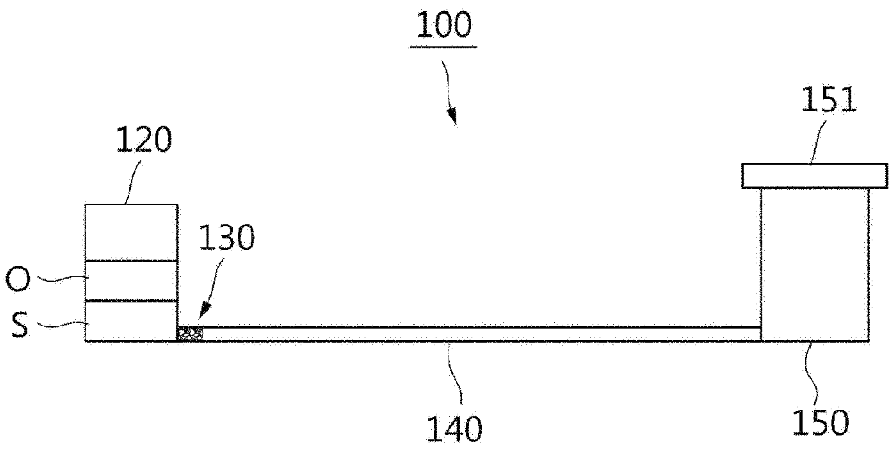
FIG. 2 is a diagram schematically showing a cross section of a microfluidic device for detecting nucleic acids according to an embodiment of the present disclosure.

FIG. 1 is a diagram showing a microfluidic device 100 for detecting nucleic acids according to an embodiment of the present disclosure. FIG. 2 is a diagram schematically showing a cross section of the microfluidic device 100 for detecting nucleic acids according to an embodiment of the present disclosure.

Referring to FIG. 1 and FIG. 2, the microfluidic device 100 for detecting nucleic acids according to an embodiment of the present disclosure includes a chip body 110, a sample chamber 120, a waste chamber 150, a connection channel 140, a nucleic acid detection layer 130 and a probe linker 200.

The chip body 110 is provided in a form of a microfluidic chip in which the sample chamber 120, the waste chamber 150, and the connection channel 140 are defined. An upper body and a lower body of the chip body may be coupled to each other such that the sample chamber 120, the waste chamber 150, the connection channel 140, etc. are defined therein.

The sample chamber 120 is defined in the chip body 110, and a sample S is injected thereto. In accordance with the present disclosure, an example in which the sample chamber 120 is provided in an edge area at one side of the chip body 110 is illustrated. As shown in FIG. 2, an example in which the sample chamber 120 is formed at a relatively higher level than that of the connection channel 140 is illustrated.

The waste chamber 150 is spaced apart from the sample chamber 120 and is formed in the other edge area of the chip body 110 and in the chip body 110.

The connection channel 140 is defined in the chip body 110 so as to connect the sample chamber 120 and the waste chamber 150 to each other. In this regard, the connection channel 140 acts as a flow path through which the sample S injected and received into the sample chamber 120 flows toward the waste chamber 150.

That is, the connection channel 140 is formed in a form of a micro channel that communicates the sample chamber 120 and the waste chamber 150 to each other. In accordance with the present disclosure, an example in which the connection channel has an inlet connected to the sample chamber 120 and an outlet connected to the waste chamber 150 is illustrated.

The nucleic acid detection layer 130 is installed in the inlet of the connection channel 140. In this regard, at least one or more micro-holes 132 extending in a flow direction of the sample S is defined in the nucleic acid detection layer 130. Thus, even when the nucleic acid detection layer 130 is installed so as to block the inlet of the connection channel 140, the flow of the sample S toward the connection channel 140 through the micro-hole 132 is possible.

Figure 3:
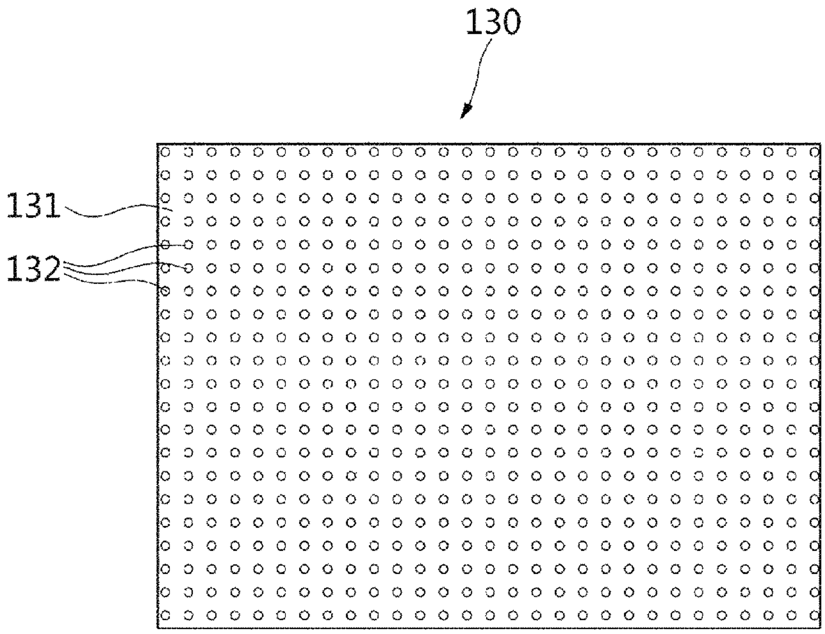
FIG. 3 is a diagram showing an example of a nucleic acid detection layer of a microfluidic device for detecting nucleic acids according to an embodiment of the present disclosure.

FIG. 3 is a diagram showing an example of the nucleic acid detection layer 130 of the microfluidic device 100 for detecting nucleic acids according to an embodiment of the present disclosure. The embodiment shown in FIG. 3 is an example in which the nucleic acid detection layer 130 is provided in a form of a mesh. A plurality of micro-holes 132 are defined in a square-shaped membrane 131. The nucleic acid detection layer 130 may be manufactured by punching the plurality of micro-holes 132 through a square nylon membrane 131. In another example, the membrane 131 having the plurality of micro-holes 132 defined therein may be applied as the nucleic acid detection layer 130 according to the present disclosure.

In this regard, the micro-hole 132 of the nucleic acid detection layer 130 may be formed so as to have various sizes depending on a size of the target nucleic acid. Elements other than the target nucleic acid can pass through the micro-hole 132, thereby preventing clogging of the micro-hole 132 with the other elements. In accordance with the present disclosure, it is exemplified that a diameter of the micro-hole 132 is determined in a range of 50 nm to 50 um.

The probe linker 200 is formed on a surface of the nucleic acid detection layer 130. Preferably, the probe linker 200 may also be formed on an inner face of the micro-hole 132 formed on the nucleic acid detection layer 130. In this regard, a hydrogel formed via amplification resulting from complementary binding between the probe linker 200 formed on the surface of the nucleic acid detection layer 130 and the target nucleic acid may block the micro-hole formed in the nucleic acid detection layer 130 or may reduce the size thereof. Thus, when the sample S accommodated in the sample chamber 120 flows through the connection channel 140, a final reach distance, an arrival time to the final reach distance, and a flow rate of the sample S may change. In addition, at least one of the final reach distance, the arrival time, and the flow rate may be used to detect the target nucleic acid.

Figure 6:
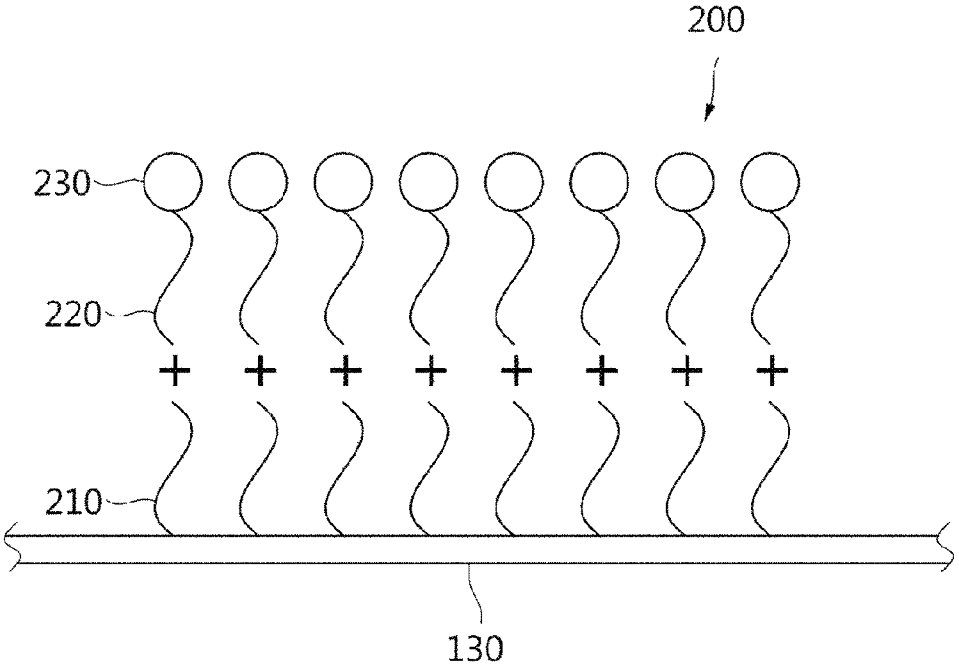
FIG. 6 is a diagram for illustrating examples of a sample sensor of a microfluidic device for detecting nucleic acids according to an embodiment of the present disclosure.

FIG. 6 is a diagram showing an example of the probe linker 200 of the microfluidic device 100 for detecting nucleic acids according to an embodiment of the present disclosure. Referring to FIG. 6, an example in which the probe linker 200 according to the present disclosure includes a coated portion 210, a primer 220, and a template 230 is illustrated.

The coated portion 210 is coated on a surface of the nucleic acid detection layer 130. The coated portion 210 is made of a material to which the primer 220 can be attached and fixed. For example, the coated portion 210 may contain a carboxyl group or an amine group. In a specific example, the coated portion 210 may include one or more selected from the group consisting of 5-hydroxydopamine hydrochloride, norepinephrine, epinephrine, pyrogalolamine, DOPA (3,4-Dihydroxyphenylalanine), catechin, tannins, pyrogalol, pyrocatechol, heparin-catechol, chitosan-catechol, polyethylene glycol-catechol, polyethyleneimine-catechol, polymethyl methacrylate-catechol, hyaluronic acid-catechol, polylysine-catechol, and polylysine.

The primer 220 is fixed to the coated portion 210, and the template 230 binds to the primer 220 in a complementary manner. In this regard, the template 230 includes a first binding site binding to the target nucleic acid in a complementary manner, a second binding site binding to the primer 220 in a complementary manner, and a complementary third binding site in the template 230 to form a dumbbell shape. Further, the first binding sites are respectively formed at both opposing ends of the template 230 so as to be separated from each other, and the second binding site is formed between the separated first binding sites.

In this regard, the primer 220 may include at least one selected from the group consisting of thiol, amine, hydroxyl, carboxyl, isothiocyanate, NHS ester, aldehyde, epoxide, carbonate, HOBt ester, glutaraldehyde, carbamate, imidazole carbamate, maleimide, aziridine, sulfone, vinylsulfone, hydrazine, phenyl azide, benzophenone, anthraquinone and a diene group. A terminal thereof may be modified.

In this regard, under the above configuration, the target nucleic acid binds to the probe linker 200 according to the present disclosure and thus is amplified. The amplified target nucleic acids are entangled with each other to form a large-sized hydrogel. Thus, the micro-hole 132 formed in the nucleic acid detection layer 130 is blocked.

The link prober 200 in the above example is configured, by way of example, based on a configuration disclosed in the paper published by Ho Yeon Lee et al. on 2015 'DhITACT: DNA Hydrogel Formation by Isothermal Amplification of Complementary Target in Fluidic Channels (Jun. 17, 2015, Advanced Materials, Volume 27, Issue 23, Pages 3513-3517). The detailed description thereof is as described in the above paper.

As described above, the nucleic acid detection layer 130 according to an embodiment of the present disclosure is installed in the inlet of the connection channel 140. Thus, the sample S accommodated in the sample chamber 120 flows into the connection channel 140 through the micro-hole 132 of the nucleic acid detection layer 130 installed in the inlet of the connection channel 140. A bubble phenomenon of the sample S occurring in the process in which the sample passes through the micro-hole 132 in the process of flowing along the connection channel 140 may be prevented.

More specifically, in a 'microfluidic device 100 for detecting a target gene' as disclosed in the above-mentioned Korean Patent No. 10-1799192, the microbead packing is installed in a middle area of the microchannel by way of example.

However, when the sample S passes through the pores formed in the microbead packing, bubbles are generated when the flow rate is high. The bubble acts as a cause of interfering with the flow of the sample S. Therefore, when the flow pressure is reduced to prevent the bubble generation, not only the reproducibility in detecting the nucleic acid is lowered, but also frequent flow pressure control is required, which limits the detection process.

On the contrary, in the microfluidic device 100 for detecting the nucleic acids according to an embodiment of the present disclosure, the nucleic acid detection layer 130 is installed in the inlet of the connection channel 140. When the sample flows from the sample chamber 120 to the connection channel 140, the sample S flows directly through the micro-hole 132 of the nucleic acid detection layer 130, thereby removing the bubble generation phenomenon and thus increasing the reproducibility in detection.

As this bubble generation phenomenon is eliminated, not only may the restriction of flow pressure control be removed, but also using the single nucleic acid detection layer 130 may allow the flow control at a lower pressure than that when the microbead packing is used.

In this regard, the microfluidic device 100 for detecting nucleic acids according to an embodiment of the present disclosure may further include stirring means 121 installed in the sample chamber 120 as shown in FIG. 1 and FIG. 2.

The stirring means 121 rotates inside the sample chamber 120 and stirs the sample S injected into the sample chamber 120. Thus, the sample S in the sample chamber 120 evenly contacts the nucleic acid detection layer 130 installed in the inlet of the connection channel 140 while being stirred by the stirring means 121. Thus, the probability that the target nucleic acid in the sample S binds to the probe linker 200 formed on the nucleic acid detection layer 130 in a complementary manner in the stirring process increases.

Accordingly, in the microfluidic device 100 for detecting nucleic acids according to an embodiment of the present disclosure, the sample S in the sample chamber 120 is stirred for a predetermined stirring time duration by the stirring means 121, and then the sample S flows along the connection channel 140. In this regard, the stirring time duration is set to a value within a range of 5 to 30 minutes, for example. The stirring time duration is preferably set in consideration of a time required for the complementary binding between the probe linker 200 and the target nucleic acid, and the test time.

Further, the sample S in the sample chamber 120 may be heated to a preset temperature range. In this regard, the temperature range is set to an optimal reaction temperature for the amplification process via the complementary binding between the probe linker 200 and the target nucleic acid, that is, the PCA reaction. In accordance with the present disclosure, the temperature is set to a value within a range of 30 to 37° C.

According to this configuration, in the stirring process, the target nucleic acid in the sample S is sufficiently combined with the probe linker 200 formed on the surface of the nucleic acid detection layer 130. Further, when the sample S flows along the connection channel 140 through the micro-hole 132 of the nucleic acid detection layer 130, or the micro-hole 132 can be blocked at an earlier time, or a time taken to reach a preset distance can be shortened. Thus, a detection time may be reduced.

Further, before the sample S passes through the micro-hole 132, the target nucleic acid in the sample S and the probe linker 200 are connected to each other. Thus, the possibility of occurrence of the bubble phenomenon according to the flow of the sample S through the micro-hole 132 may be lowered.

Figure 4:
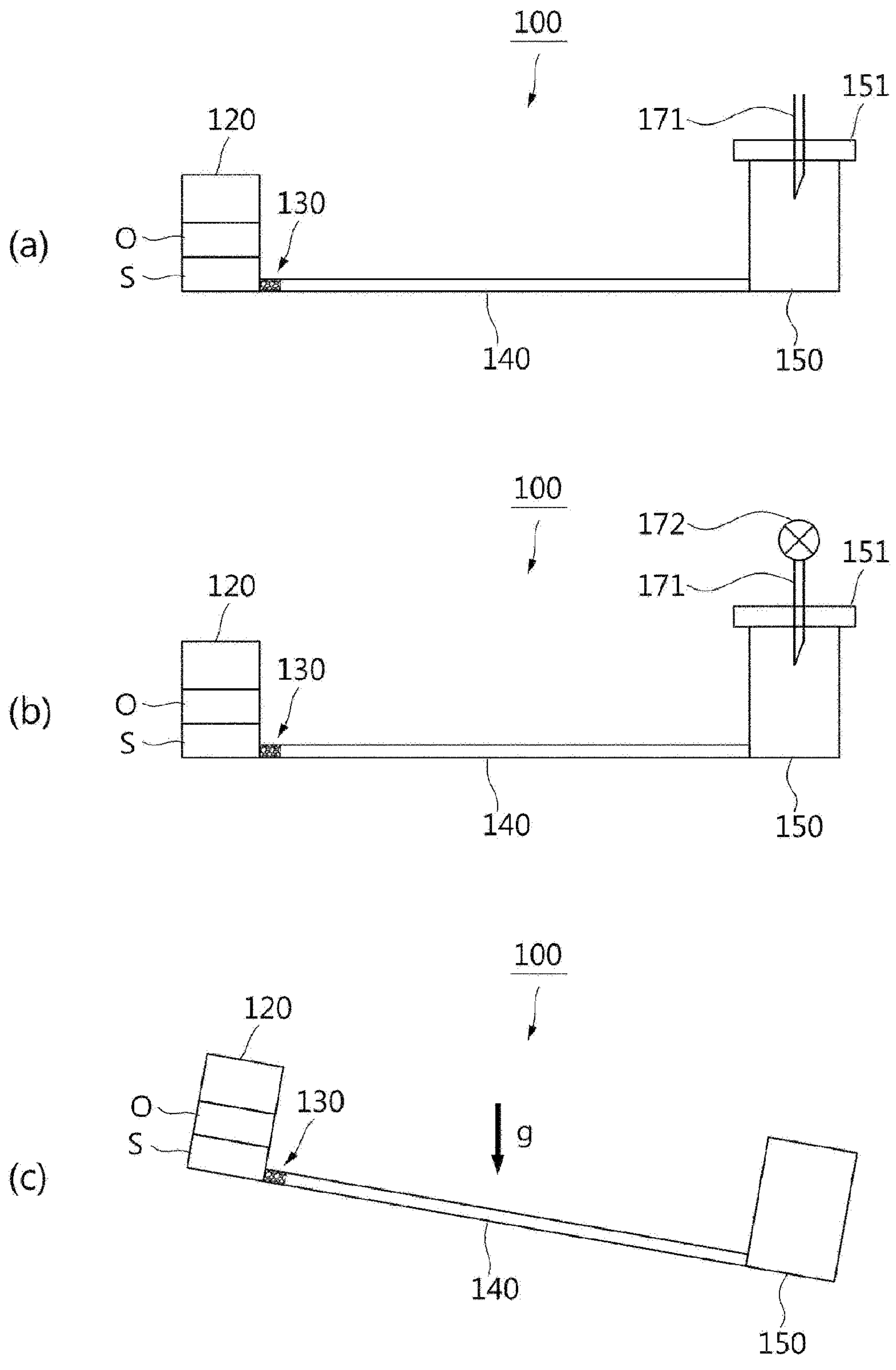
FIG. 4 is a diagram showing an example of a probe linker of a microfluidic device for detecting nucleic acids according to an embodiment of the present disclosure.

FIG. 4 is a diagram for illustrating examples for applying a flow force to the sample S in the microfluidic device 100 for detecting nucleic acids according to an embodiment of the present disclosure.

In an embodiment as shown in (a) of FIG. 4, in a state where the waste chamber 150 is blocked with a stopper, the stirring means 121 stirs the sample S in the sample chamber 120 during the stirring time as described above. Then, a waste chamber cover 151 is stabbed with an object such as an injection needle 171 such that an exhaust hole is formed in the cover 151. Thus, a differential head occurs between the empty waste chamber 150 and the sample chamber 120, such that the sample S in the sample chamber 120 flows into the connection channel 140 through the micro-hole 132 of the nucleic acid detection layer 130.

In an embodiment as shown in (b) of FIG. 4, it is a diagram showing an example of providing the negative pressure for the flow of the sample S to the waste chamber 150 using a negative pressure device 172, for example, a syringe pump. In an embodiment as shown in (c) of FIG. 4, the chip body 110 itself is tilted downwardly toward the waste chamber 150 to provide a flow force to the sample S of the sample chamber 120 such that the sample flows toward the connection channel 140 under the gravity.

In this regard, after the sample S is injected into the sample chamber 120, an oil O such as mineral oil O that is not mixed with the sample S may be injected into the sample chamber. Thus, the oil O disposed on a top face of the sample S blocks the sample S from the outside. That is, the oil not only blocks the inflow of foreign substances from the outside into the sample S but also blocks the sample S from external air so that the sample S is not evaporated into the air during the stirring process. Further, the oil O provides an effect of increasing the flow force due to the aforementioned gravity or differential head for the flow of the sample S to the connection channel 140.

Again, referring to FIG. 1, in an embodiment shown in FIG. 1, a sample sensor 160 has an LED module 161 irradiating light, and a photodiode 162 detecting light emitted from the LED module 161. The LED module 161 is positioned on one side of the connection channel 140 so as to irradiate light toward the inside of the connection channel 140. The photodiode 162 is disposed on the other side of the connection channel 140 opposite to the LED module 161 so as to receive the light irradiated from the LED module 161. In this regard, the LED module 161 and the photodiode 162 may be arranged such that the connection channel 140 is disposed therebetween. Thus, when the sample S flows along the connection channel 140, the sample S blocks the light irradiated from the LED module 161. Thus, a maximum travel distance by which the sample S flows along the connection channel 140 or the arrival time corresponding to the maximum travel distance may be detected.

Figure 5:
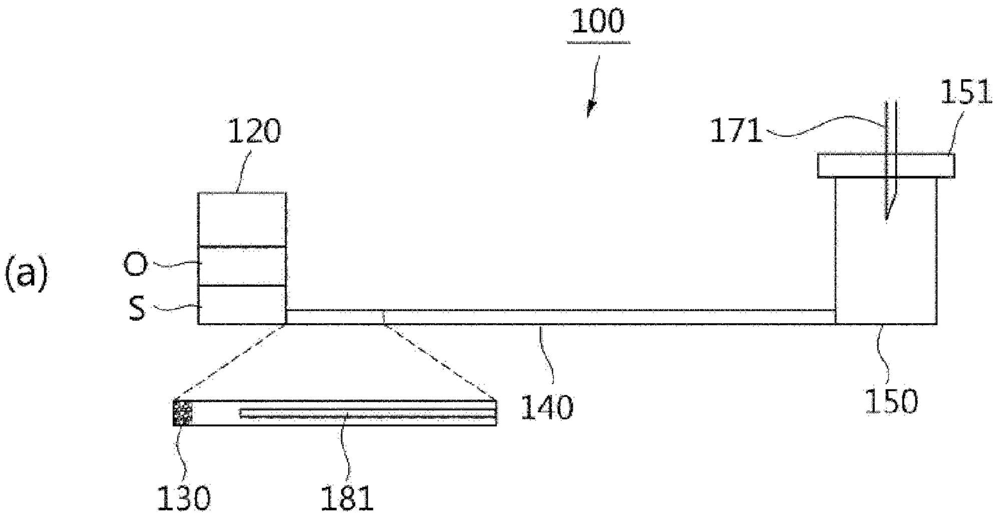
FIG. 5 is a diagram for illustrating examples for applying a flow force to a sample in a microfluidic device for detecting nucleic acids according to an embodiment of the present disclosure.
Figure 5:
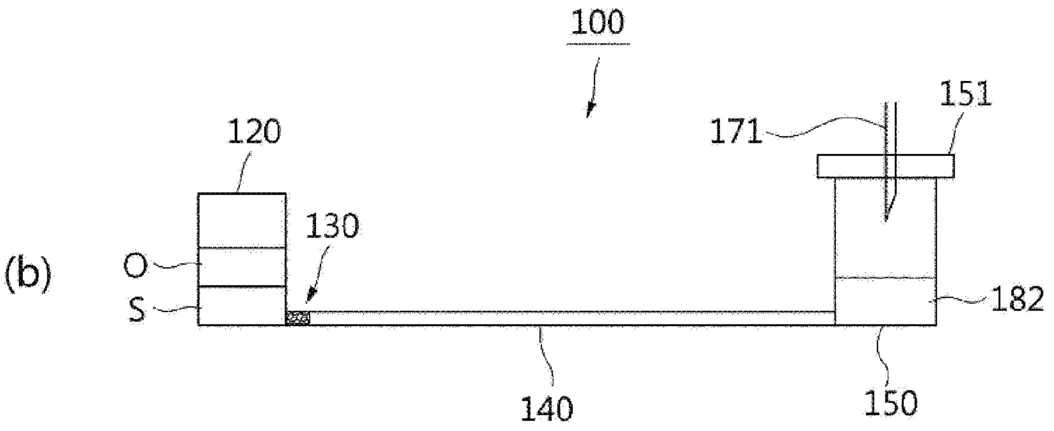

FIG. 5 is a diagram for illustrating examples of the sample sensor 160 of the microfluidic device 100 for detecting nucleic acids according to an embodiment of the present disclosure.

In an embodiment as shown in (a) of FIG. 5, the sample sensor 160 includes a sample sensing member 181 such as a stick bar made of a porous material or a litmus test strip installed inside the connection channel 140. When the sample sensing member 181 reacts with the sample S, a color of the sample sensing member 181 changes. In this regard, the sample sensor 160 may include a camera, and may be configured to detect a flow distance of the sample S based on an image captured by the camera.

In an embodiment shown in (b) of FIG. 5 as an example of the sample sensor 160, in the state where a variable color substance 182 whose a color is changer when reacting with the sample S is accommodated in the waste chamber 150, a time at which the sample S reaches the waste chamber 150 may be determined based on the color change of the variable color substance 182.

Figure 7:
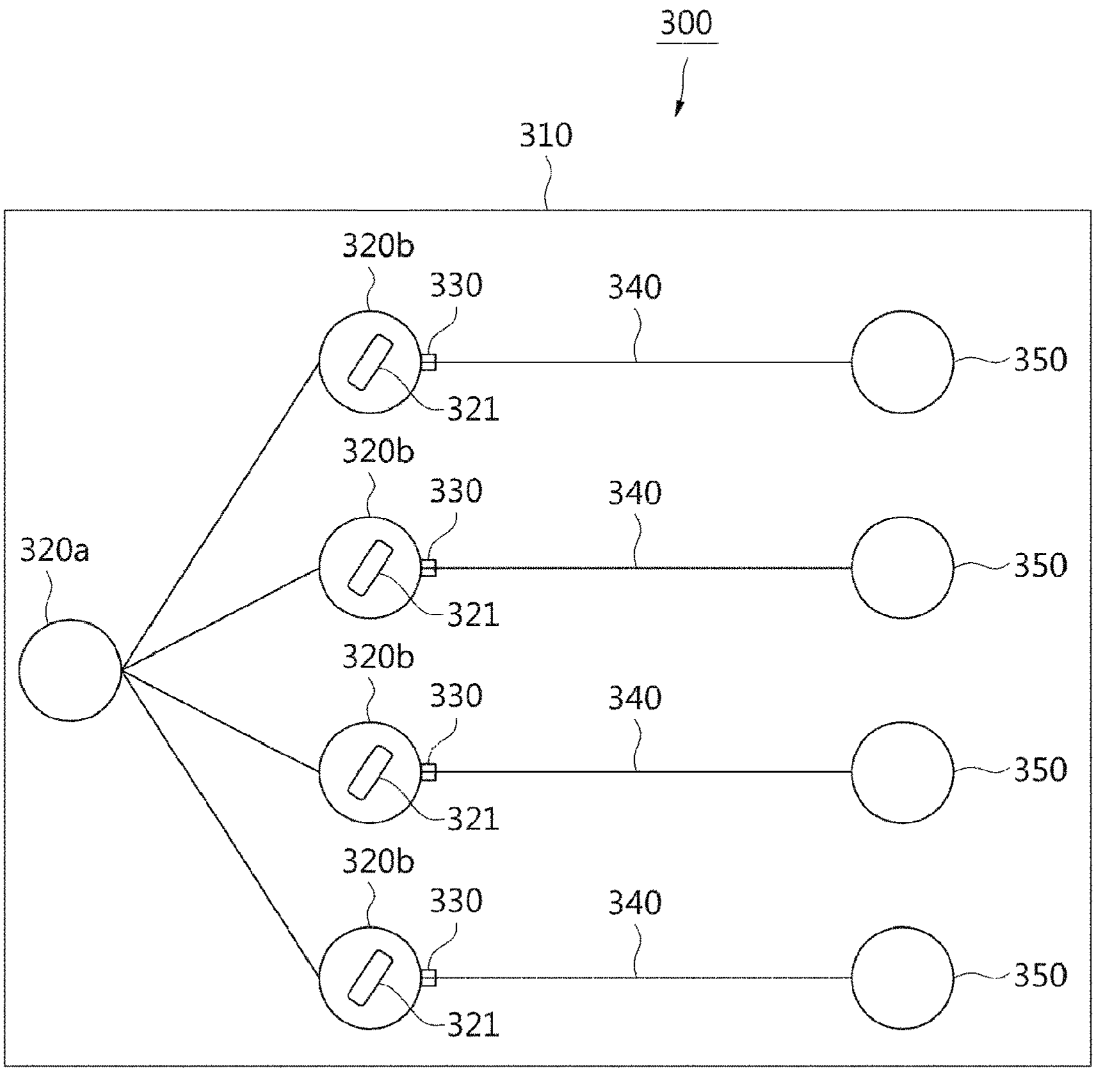
FIG. 7 is a diagram showing a microfluidic device for detecting nucleic acids according to another embodiment of the present disclosure.

FIG. 7 is a diagram showing a microfluidic device 300 for detecting nucleic acids according to another embodiment of the present disclosure.

The connection channel 340 in the microfluidic device 300 for detecting nucleic acids according to an embodiment shown in FIG. 7 includes a plurality of connection channels 340 defined in the chip body 310 so as to independently connect the sample chambers **320*a* and 320*b* and the waste chambers 350** to each other, respectively.

In this regard, the sample chamber **320*a* and 320*b* may include a sample receiving chamber 320*a* and a plurality of stirring chambers 320*b*. The stirring chambers 320*b* are connected to the waste the chambers 350 via the connection channels 340, respectively. That is, the inlet of each connection channel 340 may be connected to a corresponding stirring chamber 320*b*. Each nucleic acid detection layer 330 may be installed in the inlet of each connection channel 340**.

In this regard, the probe linkers 200 formed on the surfaces of the nucleic acid detection layers 330 installed in the inlets of the connection channels 340 respectively, may be made of different materials that bind to different target nucleic acids, respectively. Thus, a plurality of target nucleic acids may be simultaneously detected using the single microfluidic device 300 for detecting nucleic acids.

In this regard, in accordance with the present disclosure, the waste chamber 350 includes a plurality of water chambers which are connected to the connection channels 340, respectively. However, in another example, one waste chamber 350 may be configured to be connected to the connection channels 340.

In another example, the nucleic acid detection layer 330 installed in one of the plurality of connection channels 340 may be free of the probe linker. Thus, the connection channel corresponding thereto may act as a negative reference channel. That is, in the nucleic acid detection layer 330 to which the probe linker is not attached, the amplification reaction of the nucleic acid does not occur, so that the sample S flows smoothly, which may be compared to the flow due to clogging of the other nucleic acid detection layers 330.

In another example, the probe linker formed on the nucleic acid detection layer 330 installed on one of the plurality of connection channels 340 may be configured such that the nucleic acid amplification occurs regardless of the presence or absence of the target nucleic acid. Thus, the connection channel corresponding thereto may act as a positive reference channel. That is, in contrast to the negative reference channel, in the positive reference channel, the clogging occurs at the beginning of the flow of the sample S. This may be compared to the flow of the sample S through the other connection channels 340.

Although several embodiments of the present disclosure have been shown and described, those skilled in the art with ordinary knowledge in the art to which the present disclosure pertains will appreciate that modifications may be made to the present embodiments without departing from the spirit or principle of the present disclosure. The scope of the present disclosure will be defined based on the appended claims and their equivalents.

REFERENCE NUMERALS

100,300: microfluidic device 110,310: chip body
120: sample chamber 320*a*: sample receiving chamber
320*b*: stirring chamber 121,321: stirring means
130,330 nucleic acid detection layer 131: membrane 132: micro-hole
140,340: connection channel 150,350: waste chamber
160: sample sensor 161: LED module
162: photodiode 171: injection needle
172: negative pressure device 181: sample detection member
182: variable color substance 200: probe linker
210: coated portion 220: primer
230: template

What is claimed is:

1. A microfluidic device for detecting nucleic acids, the microfluidic device comprising:

a chip body;

a sample chamber defined in the chip body so as to receive a sample therein;

a waste chamber spaced apart from the sample chamber and defined in the chip body;

a connection channel defined in the chip body so as to connect the sample chamber and the waste chamber to each other, wherein the connection channel acts as a flow path of the sample in the sample chamber, and has an inlet connected to the sample chamber and an outlet connected to the waste chamber;

a nucleic acid detection layer disposed perpendicular to the flow path of the sample at an interface between the sample chamber and the connection channel, wherein the nucleic acid detection layer is a single planar membrane having a plurality of micro-holes disposed therethrough; and a plurality of probe linkers disposed on a surface of the nucleic acid detection layer, wherein the probe linker is amplified via complementary binding to a target nucleic acid in the sample and detects the target nucleic acid.

2. The microfluidic device of claim 1, further comprising a stirrer installed in the sample chamber so as to stir the sample injected into the sample chamber, wherein while the stirring means stirs the sample in the sample chamber, the probe linker of the nucleic acid detection layer and the target nucleic acid in the sample are complementarily bind to each other.

3. The microfluidic device of claim 2, wherein the sample in the sample chamber is stirred by the stirred for a predetermined stirring time duration, and then flows along the connection channel.

4. The microfluidic device of claim 1, further comprising a sample sensor for detecting the sample flowing along the connection channel, wherein at least one of the final reach distance, the arrival time, or the flow rate is measured based on a detection result of the sample sensor.

5. The microfluidic device of claim 1, wherein the connection channel includes a plurality of connection channels defined in the chip body so as to individually connect the sample chamber and the waste chamber to each other, wherein each of the nucleic acid detection layers is installed in the inlet of each of the connection channels;

wherein the plurality of probe linkers formed on the surface of the nucleic acid detection layer are made of different materials that bind to different target nucleic acids, respectively.

6. The microfluidic device of claim 5, wherein the probe linker is not attached to the nucleic acid detection layer installed in the inlet of one of the plurality of connection channels, wherein the one of the plurality of connection channels acts as a negative reference channel.

7. The microfluidic device of claim 5, wherein the probe linker formed on the nucleic acid detection layer installed in one of the plurality of connection channels is configured such that nucleic acid amplification occurs regardless of presence of the target nucleic acid, wherein one of the plurality of connection channels acts as a positive reference channel.

* * * * *